(12) United States Patent
Nagata et al.

(10) Patent No.: US 6,392,716 B1
(45) Date of Patent: May 21, 2002

(54) TELEVISION RECEIVER

(75) Inventors: Tsuyoshi Nagata; Akemi Okamoto, both of Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/331,588

(22) PCT Filed: Jan. 22, 1998

(86) PCT No.: PCT/JP98/00285

§ 371 Date: Jul. 1, 1999

§ 102(e) Date: Jul. 1, 1999

(87) PCT Pub. No.: WO98/33319

PCT Pub. Date: Jul. 30, 1998

(30) Foreign Application Priority Data

Jan. 24, 1997 (JP) ............................................. 9-011237
Nov. 28, 1997 (JP) ............................................. 9-327965

(51) Int. Cl.⁷ ............................ H04N 5/63; H04N 5/50; H04N 5/44
(52) U.S. Cl. ..................... 348/731; 348/730; 348/732; 348/725; 348/553; 348/570; 348/569
(58) Field of Search ................................. 348/731, 732, 348/730, 733, 569, 570, 725, 553; H04N 5/50, 5/63

(56) References Cited

U.S. PATENT DOCUMENTS

| | | | | |
|---|---|---|---|---|
| 4,245,349 A | * | 1/1981 | Kumaoka et al. ............ 455/165 |
| 4,337,486 A | * | 6/1982 | Akutsu et al. ............... 358/155 |
| 4,387,401 A | * | 6/1983 | Henderson et al. ....... 358/193.1 |
| 4,516,170 A | * | 5/1985 | Skerlos .................... 358/191.1 |
| 4,598,425 A | * | 7/1986 | Skerlos ........................ 455/180 |
| 4,860,380 A | | 8/1989 | Mengel | |
| 4,897,727 A | * | 1/1990 | Richards ................... 358/194.1 |
| 5,157,496 A | * | 10/1992 | Kurosawa ................. 358/194.1 |
| 5,371,550 A | * | 12/1994 | Shibutani et al. ........... 348/570 |
| 5,416,528 A | | 5/1995 | Yoshimi | |
| 5,428,405 A | * | 6/1995 | Lee .............................. 348/731 |
| 5,564,088 A | * | 10/1996 | Saitoh ....................... 455/186.1 |
| 5,631,698 A | | 5/1997 | Lee | |
| 5,701,599 A | | 12/1997 | Aihara | |
| 6,002,451 A | * | 12/1999 | Arikane et al. ............. 348/735 |

FOREIGN PATENT DOCUMENTS

| | | |
|---|---|---|
| DE | 31 45 407 A1 | 5/1983 |
| EP | 0 808 020 A1 | 11/1997 |

OTHER PUBLICATIONS

EPO Search Report, Apr. 11, 2000.

* cited by examiner

*Primary Examiner*—Andrew Faile
*Assistant Examiner*—Paulos Natnael
(74) *Attorney, Agent, or Firm*—Arent Fox Kintner Plotkin & Kahn, PLLC

(57) ABSTRACT

An arrangement is provided whereby after purchasing a television receiver, when a power cord is plugged in an outlet and the power is turned on, the television receiver is automatically set on an automatic presetting mode, and various information is displayed by on screen display (OSD) during the operation and upon completion of the operation, thereby allowing a user to visually confirm the operating condition. To this end, when a power plug 17 is inserted, a power switch of a power supply circuit 16 is turned on, a broadcast channel of a station is detected by a synchronizing signal and an AFT voltage and is automatically preset in a nonvolatile memory. During the presetting, a message that a presetting function is operating and a message indicating an operating condition are displayed on a CRT 3. Further, upon completion of all the presetting, a message on he completion of operation is displayed.

5 Claims, 8 Drawing Sheets

FIG. 5 (A)

Thank you for your purchasing your SANYO TV.
Now I am searching and storing all programmes.      Please wait.

AUTO                    1    VL S-1
|||||||||----------------------------

FIG. 5 (B)

Auto set-up completed.  Happy viewing!

Programmierung beendet.  Viel spaβ!

Recherche automatique terminée!

FIG. 6

DISPLAY CONTENTS

[ ENGLISH ]   Thank you for purchasing your SANYO TV.
Now I am searching and storing all programmes.     Please wait.

[ GERMAN ]   Vielen Dank, daß Sie diesen SANYO-Fernseher gekauft haben.
Ich suche und speichere jetzt alle Programme.     Bitte warten.

[ FRENCH ]   Merci beaucoup d'avoir acheté ce téléviseur SANYO.
Je cherche et mémorise tous les programmes.     Attendez S.V.P.

TELEVISION RECEIVER

TECHNICAL FIELD

The present invention relates to a television receiver having a channel tuning system which is capable of automatically tuning a channel and storing the tuning data in a nonvolatile memory.

BACKGROUND ART

The first thing that a user does after purchasing a television receiver is to store tuning data in a nonvolatile memory of a channel tuning system of the television receiver while searching channels which can be received after connecting the television receiver to an antenna.

With such a method, however, since after the user has tuned the channel tuning system to channels to be received, the tuning data is stored in a memory, it is necessary to perform this operation for each position at which the tuning data can be stored in the memory, so that it is troublesome. In addition, to perform such an operation after understanding the procedure of the operation, there arises such a problem that the operation must be carried out while referring to an instruction manual on each such occasion.

Accordingly, there has been proposed a television receiver having a function called automatic presetting which makes it possible to effect resetting automatically by operating a single switch. According to this television receiver, the user is able to allow the tuning data to be stored in a nonvolatile memory automatically without doing anything.

Referring to the block diagram in FIG. 1 and the flowchart in FIG. 3, a description will be given of this technique.

In FIG. 1, reference numeral 1 denotes a tuner; 2, a video signal processing circuit; 3, a cathode ray tube (CRT); 4, a speech signal processing circuit; 5, a speaker; 6, a synchronous separation circuit; 7, a deflection circuit; 8, a deflection yoke (hereafter referred to as "DY"); 9, a CPU; and 10, a nonvolatile memory for storing tuning data and the like.

In addition, reference numeral 11 denotes a character generator for generating character signals; 12, a D/A conversion circuit for converting the tuning data from the CPU 9 to a dc voltage; 13, an infrared remote controller (hereafter referred to as the remote controller) for issuing various control commands; 14, a remote-controller light receiving portion for receiving infrared rays of the remote control signal from the remote controller 13; 15, a panel operating portion provided on a panel portion of the television receiver; 16, a power supply circuit for supplying power to each circuit of the television receiver; and 17, a power plug socket which is connected to a commercial power source.

Next, referring to the flowchart in FIG. 3, a description will be given of the operation of the above-described conventional television receiver.

First, if an unillustrated switch for starting an automatic presetting mode is pressed by using the remote controller 13 or the panel operating portion 15, the CPU 9 outputs tuning data corresponding to channel 1 (CH 1) for the first time upon receiving the signal from the switch, and supplies a tuning voltage from the D/A conversion circuit 12 to the tuner 1 (S10).

Then, when the synchronizing signal from the synchronous separation circuit 6 and an AFT voltage from the video signal processing circuit 2 are supplied to the CPU 9, the CPU 9 determines whether or not that channel is present on the basis of the presence or absence of each signal (S11). If that channel is present, a relevant signal is drawn in to a tuning point by means of the synchronizing signal and the AFT voltage (S12). If the relevant signal is drawn in to the tuning point, the data at that time is stored in the nonvolatile memory 10 as tuning data (S13).

Subsequently, the tuning voltage is increased to proceed to an ensuing channel. To do so, it suffices if an arrangement is provided in advance such that the voltage is increased by amounts each corresponding to a one-channel portion. Alternatively, a method may be adopted in which the tuning voltage is increased gradually and is raised continuously to a point where the synchronizing signal is present (S14). If there is no channel in the above-described step (S11), the operation proceeds directly to this step. Next, if the capacity for storing the tuning data in the nonvolatile memory 10 has been exceeded, the operation ends. If it has not been exceeded (S15), a determination is made as to whether or not the present channel is an upper-limit channel, and if it is the upper-limit channel, the operation ends; whereas if it is not, the operation returns to the step for determining the presence and absence of the synchronizing signal and the AFT voltage (S16). The tuning data is automatically stored in the nonvolatile memory 10 through the above-described operation.

However, even in the case of the television receiver equipped with such an automatic presetting function, the user after having purchased the television receiver must use the presetting function after perusing an instruction manual and understanding the operation for putting this function to work.

The present invention has been devised in view of the above-described aspects, and its object is to provide an arrangement whereby after purchasing a television receiver, when a power cord is plugged in an outlet and the power is turned on, the television receiver is automatically set on an automatic presetting mode, and various information is displayed by on screen display (OSD) during the operation and upon completion of the operation, thereby allowing the user to visually confirm the operating condition.

DISCLOSURE OF THE INVENTION

In accordance with the present invention, there is provided a television receiver comprising: a tuner for receiving a television signal; memory means in which tuning data is stored in advance for each position; an operating portion for a user to select a desired selected channel; controlling means for supplying tuning voltage to the tuner on the basis of the tuning data stored at a position in the memory means corresponding to the desired channel when that position is selected by the operating portion; tuning-point detecting means for detecting a tuning point on the basis of an output of the tuner; display means for converting the output of the tuner to a video signal and displaying the same; and a power supply circuit for supplying electric power from a commercial power source to various circuits, wherein the controlling means detects whether or not the tuning data is not stored in all the positions of the memory means, and upon detecting that the power of the power supply circuit is turned on, the controlling means automatically causes presetting to be effected for each position of the memory on the basis of an output of the tuning-point detecting means.

In addition, in accordance with the present invention, there is provided a television receiver comprising: a tuner for receiving a television signal; memory means in which tuning data is stored in advance for each position; an operating portion for a user to select a desired selected channel; controlling means for supplying tuning voltage to the tuner on the basis of the tuning data stored at a position in the memory means corresponding to the desired channel when that position is selected by the operating portion; tuning-point detecting means for detecting a tuning point on the basis of an output of the tuner; display means for converting the output of the tuner to a video signal and displaying the same; character generating means for outputting various characters to the display means; and a power supply circuit for supplying electric power from a commercial power source to various circuits, wherein the controlling means detects whether or not the tuning data is not stored in all the positions of the memory means, and upon detecting that the power of the power supply circuit is turned on, the controlling means automatically causes presetting to be effected for each position of the memory on the basis of an output of the tuning-point detecting means, and causes character information notifying that presetting is operating to be outputted from the character generating means.

Further, in the television receiver in accordance with the present invention, the controlling means causes characters representing that presetting is operating to be generated from the character generating means.

Furthermore, in the television receiver in accordance with the present invention, the controlling means causes character information representing completion of presetting to be generated from the character generating means after the completion of presetting.

BRIEF DESCRIPTION OF THE DRAWINGS

FIGS. 5(A) and 5(B) are diagrams illustrating examples of display in accordance with the present invention;

FIG. 6 is a diagram illustrating other messages in accordance with the present invention;

BEST MODE FOR CARRYING OUT THE INVENTION

Figure 1:
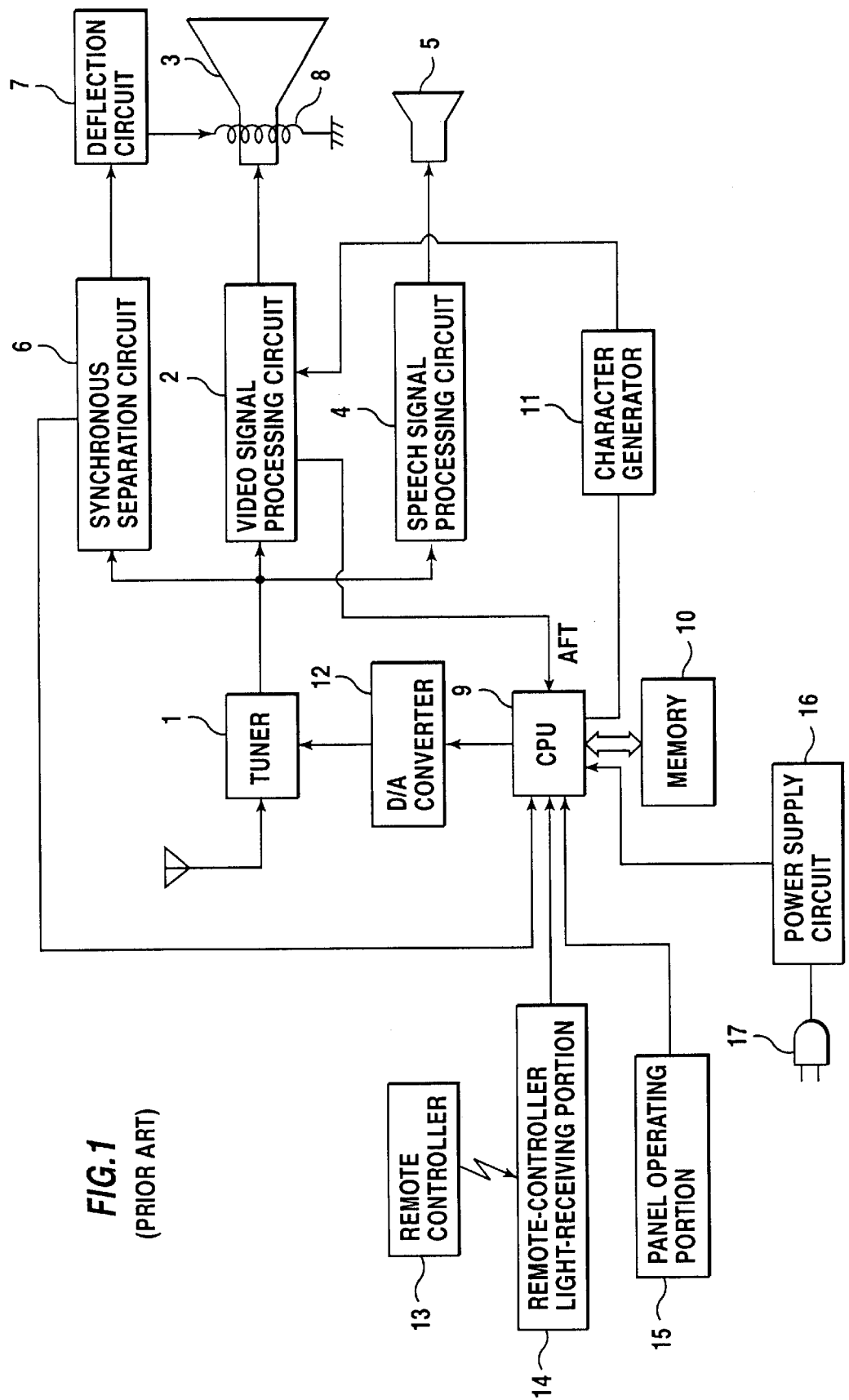
FIG. 1 is a block diagram illustrating an embodiment of the present invention.

Referring now to the drawings, a description will be given of the embodiments.

Since the block diagram in the embodiments of the present invention is identical to that of the conventional art, a description of the configuration of the hardware will be omitted. The difference with the conventional art lies in the operation of a CPU 9, and a description will be given of the operation with reference to the flowchart in FIG. 2.

First, after purchasing a television receiver, the user plugs a power cord in an outlet (S1), and a determination is then made as to whether or not a specific switch (disposed on a panel operating portion) has been pressed continuously for five seconds (S2), and if it has been pressed, a nonvolatile memory 10 is reset (S9). The reason for providing the function of resetting the nonvolatile memory 10 is that since the power is turned on for adjustment and the like at the time of shipment from a factory, at that time the automatic presetting function has been operated and undesirable data has been written in the memory, so that the undesirable preset data is deleted by the time of shipment from the factory.

Meanwhile, if it is determined in Step 2 that the specific switch has not been pressed continuously for five seconds (S2), a determination is then made as to whether or not the automatic presetting has already been effected after purchasing the television receiver (S3). The operation of this determination is carried out by determining whether the plug-and-play bit of the nonvolatile memory 10 is "1" or "0" (S3). This plug-and-play bit refers to such a bit that "1" is stored in the nonvolatile memory 10 in the case where the automatic presetting has already been effected (when the automatic presetting function has been operated in an initial state), whereas "0" is stored in the nonvolatile memory 10 in the case where the automatic presetting has not been effected.

Subsequently, if the user turns on the power switch (S4), "Welcome TEXT" is displayed on a CRT 3 from a character generator 11. In this display, for example, a message of gratitude to the user for purchasing as well as a message that automatic presetting is operating are displayed (S5), as shown in the part (A) of FIG. 5.

Further, when automatic presetting starts, characters "AUTO" indicating that automatic presetting is operating, a bar display indicating the state of adjustment, a present preset position "1," a band "VL," and a broadcast system such as "S-1: PAL BG system," "S-2: PAL I system," and "S-3: France SECAM" are displayed (S6). Consequently, the user is able to recognize the fact of the automatic presetting being in operation and the state of its operation. In addition, an arrangement is provided such that when execution of automatic presetting is started, the plug-and-play bit is set at "0," and this bit is rewritten to "1" only when the presence of a station is found.

Further, even if the power is turned on without connecting the antenna, the presence of a station cannot be determined, so that the plug-and-play bit remains "0." Therefore, if the power is turned on on a next occasion, the automatic presetting operation is effected, so that the user is able to understand that the antenna is not connected. Further, when the television receiver is moved such as at the time of house-moving, if the automatic presetting is executed without connecting the antenna, the bit is set at "0," and thus returns to the initial state.

Incidentally, since television receives in such as Europe are adapted to be able to receive programs in correspondence with various countries, it is necessary to have the contents of messages displayed correspond to the various countries. Accordingly, it suffices if the message in the part (A) of FIG. 5, for example, is changed in the stated order of English, German, French and English. The language of the message is repeatedly changed for each five seconds. The contents of this message may be such as those shown in FIG. 6.

Then, when automatic presetting is completed (S7), Ending TEXT is displayed in all the three languages (S8), as shown in the part (B) of FIG. 5. This allows the user to visually confirm that automatic presetting is completed. Incidentally, this display is canceled if a switch on either a remote controller 13 or a panel operating portion 15 is pressed. If the display is canceled, the screen returns to a normal television receiving screen.

Such messages may be displayed in English only when it is known in advance that the television receivers are sold only in Great Britain.

It should be noted that such an operation is performed only once when the power is turned on after the user purchased the television receiver, so that the same operation cannot be performed again. Accordingly, an arrangement is provided such that the automatic presetting operation can be performed again in the following manner.

Figure 4:
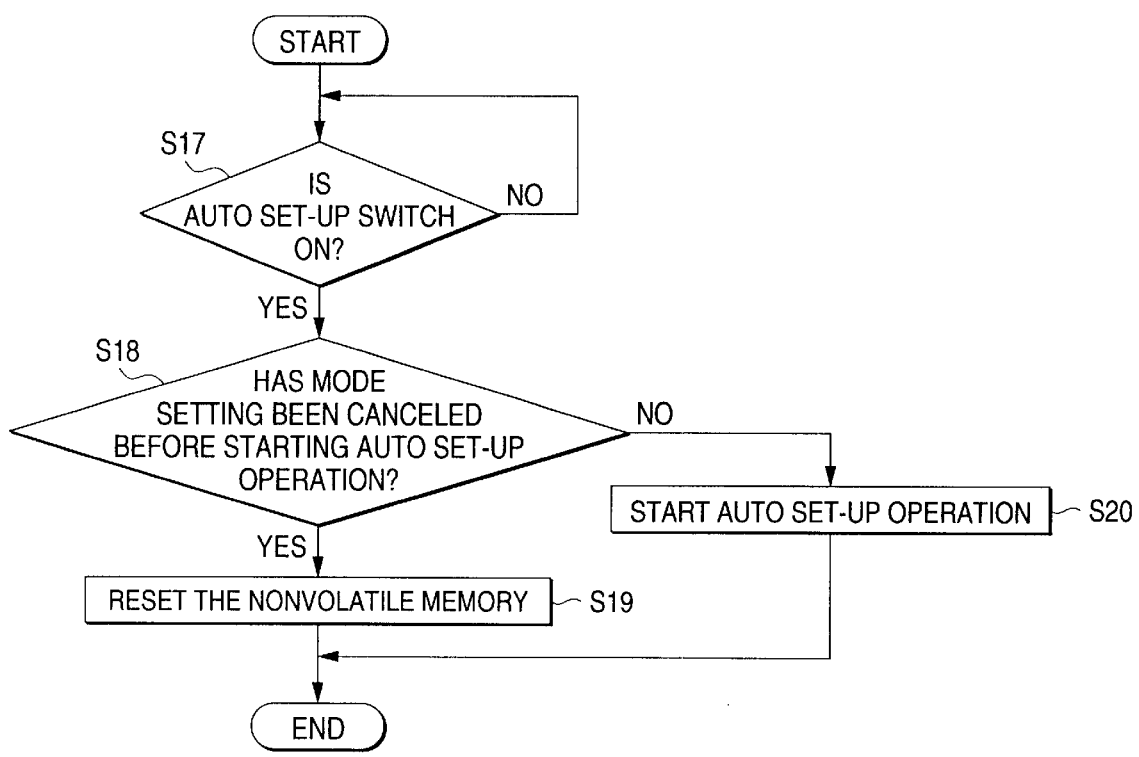
FIG. 4 is a flowchart illustrating a method of clearing the automatic presetting in accordance with the present invention.

Namely, in FIG. 4, the automatic presetting switch on the remote controller 13 or the panel operating portion 15 is turned on (S17). After the automatic presetting switch is turned on, if the automatic presetting mode is canceled by a predetermined operation during a predetermined period (e.g., five seconds) before starting the automatic presetting operation (S18), the nonvolatile memory 10 is reset to clear the tuning data (S19). The television receiver can be thereby set in the state of shipment from the factory. In addition, after the automatic presetting switch is turned on, if the automatic presetting mode is not cancelled during the predetermined period (e.g., five seconds) before starting the automatic presetting operation (S18), automatic presetting is started to perform again the operation of effecting the presetting, rewriting the contents of presetting (S20).

Incidentally, in the event that a situation has arisen in which the television receiver must be modified after shipment from the factory, the plug-and-play function operates during application of power at the time of the modification, so that undesirable preset data is stored. For this reason, after the modification, operation is required for resetting the nonvolatile memory by effecting the operation of pressing a particular switch continuously for five seconds-in the operation in Step 2. Accordingly, in an ensuing embodiment an arrangement is provided not to cause the plug-and-play operation does not occur when the power is turned on at the time of the above-described modification after shipment from the factory.

Figure 2:
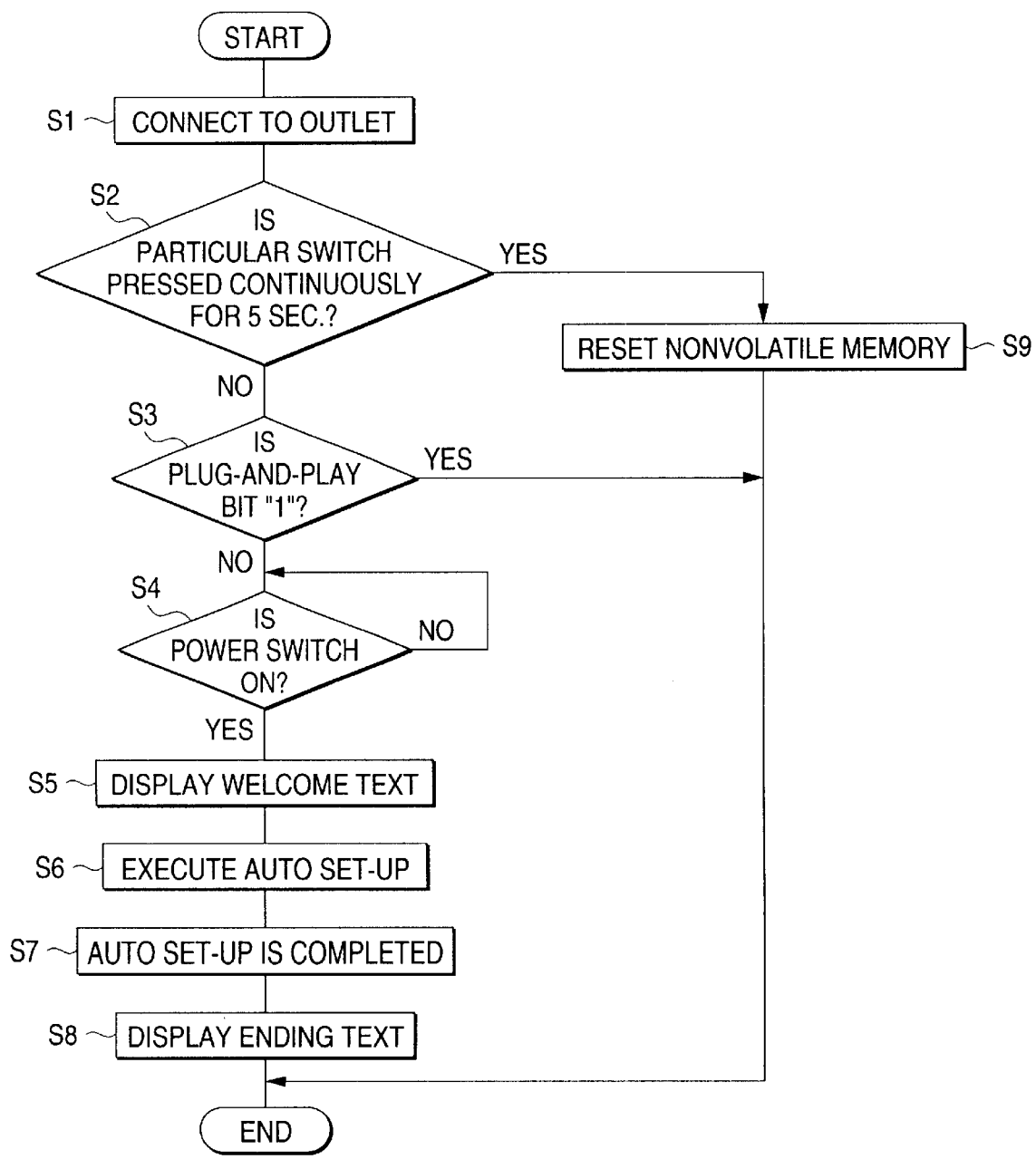
FIG. 2 is a flowchart illustrating the operation in accordance with the present invention.
Figure 3:
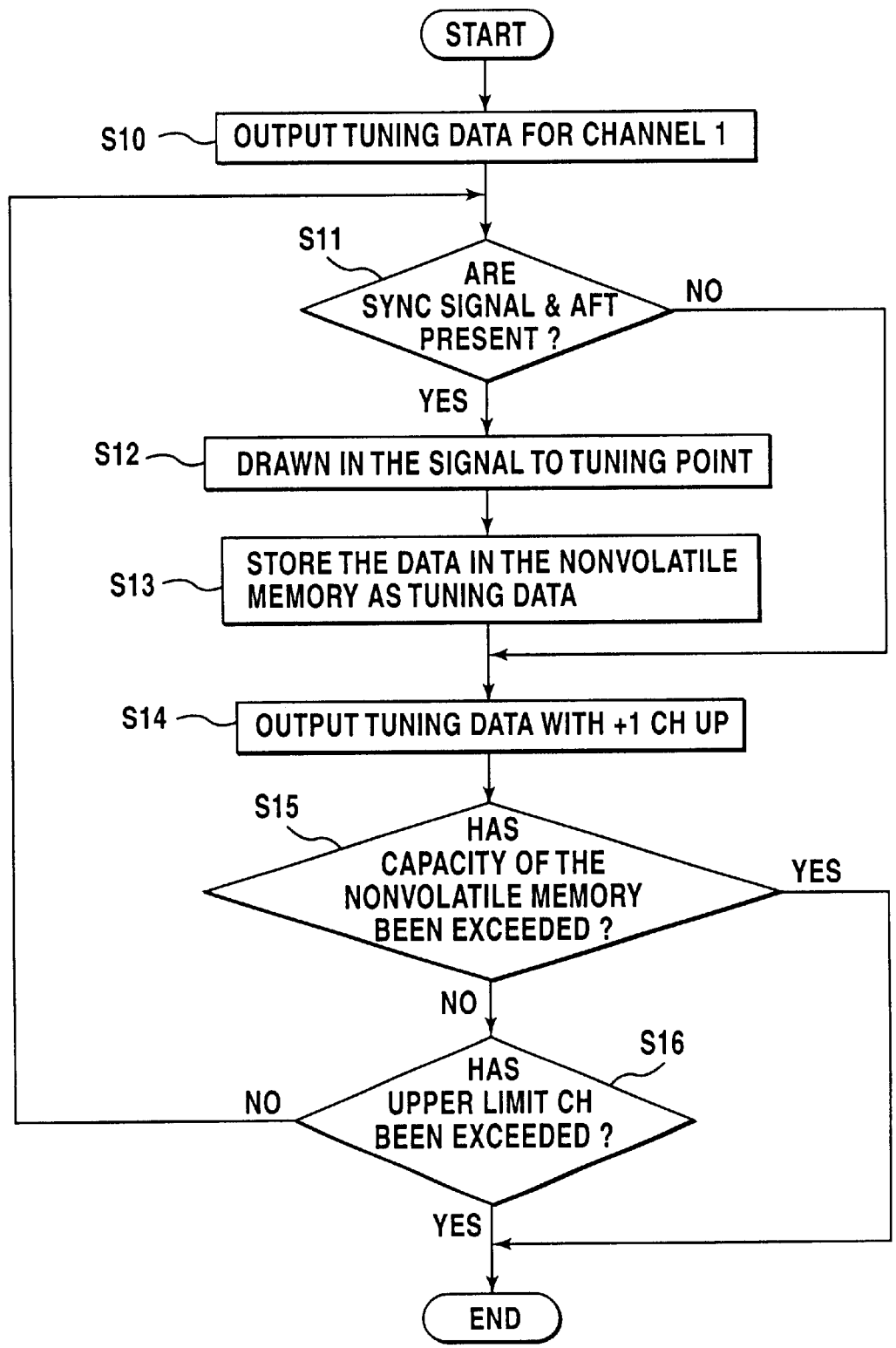
FIG. 3 is a flowchart illustrating the automatic presetting operation.
Figure 7:
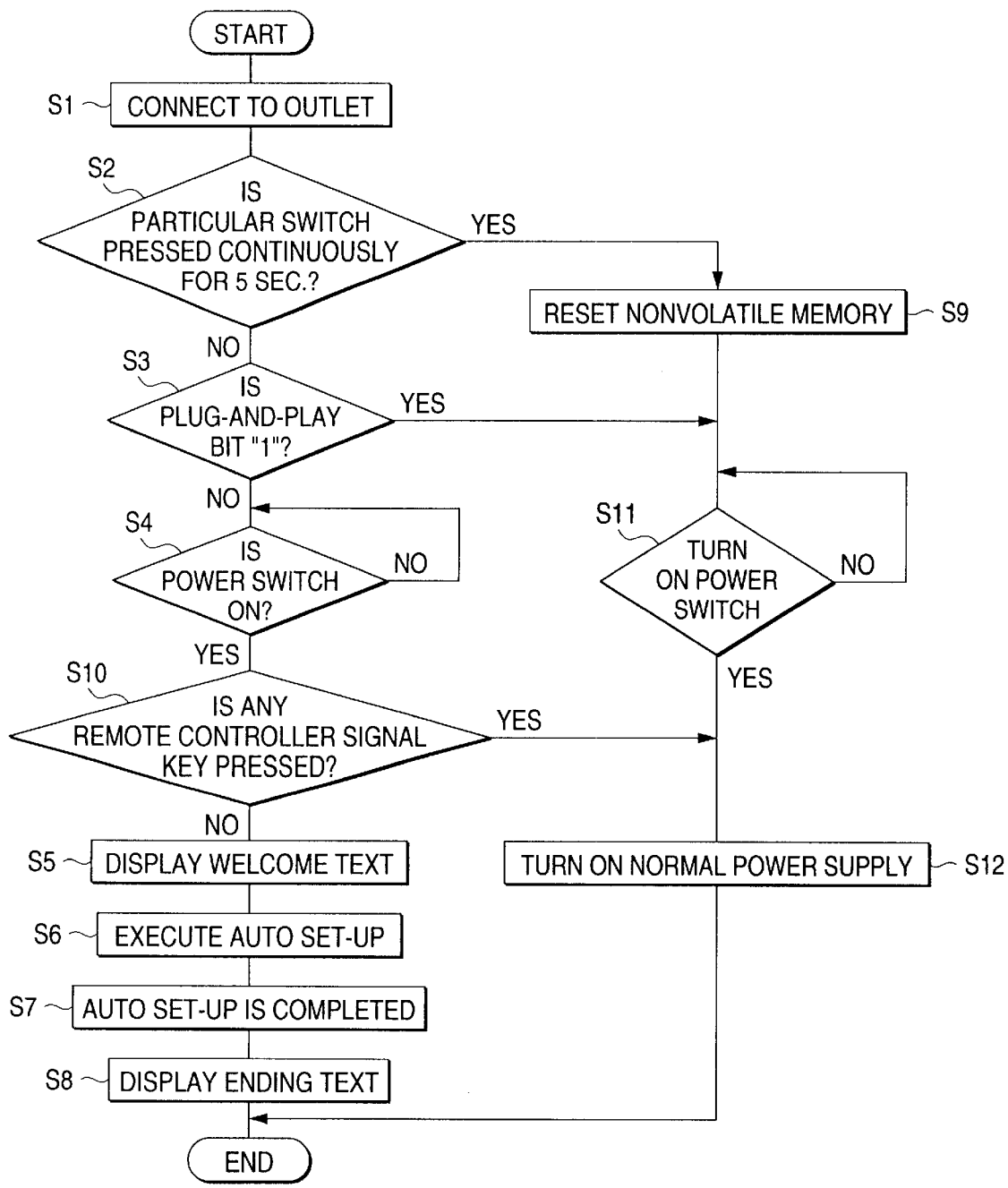
FIG. 7 is a flowchart in accordance with another embodiment of the present invention.
Figure 8:
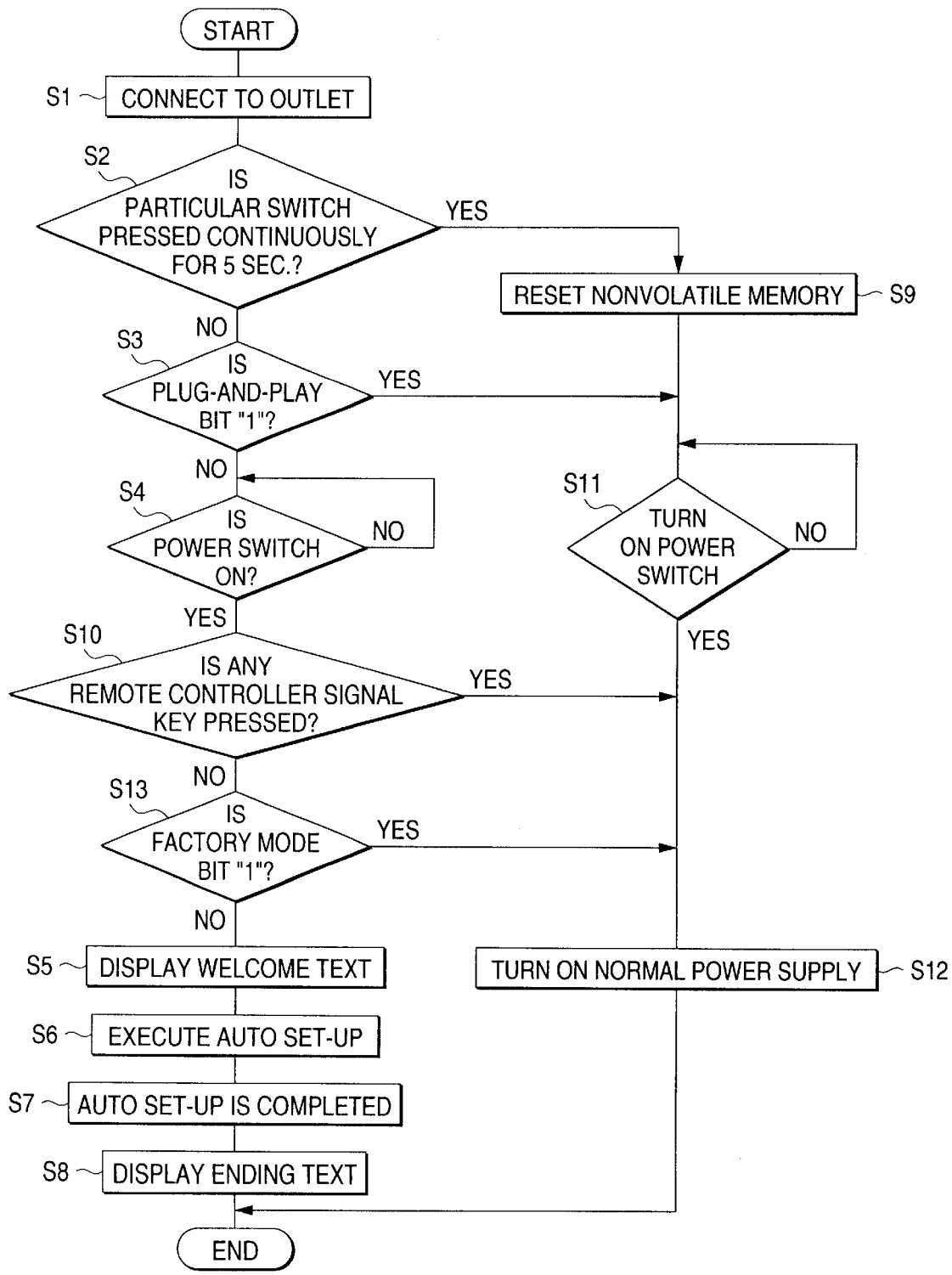
FIG. 8 is a flowchart in accordance with still another embodiment of the present invention.

Namely, the point of difference in the operation of the CPU in FIG. 7 from the operation in FIG. 2 lies in that after the power switch is turned on (S4), if it is determined that an arbitrary remote controller key has been pressed during a predetermined period (e.g., five seconds) (S10), the automatic presetting operation is not performed, and the normal power-on operation is effected in Step 14, whereas after the power switch is turned on (S4), if it is determined that the arbitrary remote controller key has not been pressed during the predetermined period (e.g., five seconds) (S10), presetting is performed by the plug-and-play operation. Accordingly, at the time of modification it suffices if the remote controller is pressed in Step 10. Incidentally, an arrangement is provided in this embodiment such that if the particular switch has been pressed continuously for five seconds in Step 2, the nonvolatile memory is reset (S9), and when the power switch is turned on (S11), the television receiver is set in the normal power-on state (S12).

In addition, as still another embodiment, a factory mode bit may be provided in the memory, and an arrangement is provided such that when the television receivers are flowing in an in-plant line, the factory mode bit is set at "1" to indicate that the mode is the factory mode, while after the shipment the factory mode bit is set at "0." Further, a step for determining the state of the factory mode bit is provided between Step 10 and Step 5, and if the factory mode bit is "1," the normal power-on operation is effected (S12), whereas if the factory mode bit is "0," the plug-and-play operation is effected. Thus, when repair is made at the factory, it is possible to apply power to the television receiver without effecting the automatic presetting operation.

As described above, in accordance with the present invention, since the tuning data can be automatically stored in the nonvolatile memory as the user who purchased the television receiver inserts a power cord in an outlet and merely turns on the power switch, the troublesome operation of the presetting operation is made unnecessary.

In addition, when the automatic presetting operation is started, the state of operation is displayed on the CRT to the effect that the automatic presetting function is operating, so that there is advantageous in that the user is able to visually confirm the state of operation.

Furthermore, the arrangement provided is such that detection is made as to whether or not the tuning data is not stored in all the positions in the memory means, detection is made as to whether or not the operating means has been operated during a fixed period after detection of the turning on of the power of the power supply circuit, and if the operation of the operating means is not detected, presetting is automatically effected for each position in the memory on the basis of an output of the tuning-point detection means, whereas if the operation of the operating means is detected, the normal power-on operation which does not accompany the presetting operation is effected. Accordingly, at the time of modifying the television receiver after shipment from the factory, power can be applied to the television receiver for modification without causing undesirable preset data to be stored.

In addition, since the memory is provided with the bit for discriminating whether or not the television receiver is in the factory mode, if an arrangement is provided such that the operation proceeds to the normal power-on state by discriminating this bit, when making repair at the factory, power can be applied to the television receiver without causing the automatic presetting function to operate.

INDUSTRIAL APPLICABILITY

The present invention is suitable for use in a channel tuning system of a television receiver.

What is claimed is:

1. A television receiver comprising: a tuner for receiving a television signal; memory means in which tuning data is stored in advance for each position; an operating portion for a user to select a desired selected channel; controlling means for supplying tuning voltage to said tuner on the basis of the tuning data stored at a position in said memory means corresponding to the desired channel when that position is selected by said operating portion; tuning-point detecting means for detecting a tuning point on the basis of an output of said tuner; display means for converting the output of said tuner to a video signal and displaying the same; and a power supply circuit for supplying electric power from a commercial power source to various circuits, wherein said controlling means detects whether or not the tuning data is not stored in all the positions of said memory means, and upon detecting that the power of said power supply circuit is turned on, said controlling means automatically causes presetting to be effected for each position of said memory on the basis of an output of said tuning-point detecting means.

2. A television receiver comprising:

a tuner for receiving a television signal;

memory means in which tuning data is stored in advance for each position;

an operating portion for a user to select a desired selected channel;

controlling means for supplying tuning voltage to said
tuner on the basis of the tuning data stored at a position
in said memory means corresponding to the desired
channel when that position is selected by said operating
portion;

tuning-point detecting means for detecting a tuning point
on the basis of an output of said tuner;

display means for converting the output of said tuner to a
video signal and displaying the same;

character generating means for outputting various characters to said display means;

and a power supply circuit for supplying electric power
from a commercial power source to various circuits, wherein said controlling means detects whether or not the
tuning data is not stored in all the positions of said
memory means, and upon detecting that the power of
said power supply circuit is turned on, said controlling
means automatically causes presetting to be effected for
each position of said memory on the basis of an output
of said tuning-point detecting means, and causes said
character generating means to output characters that
provide notice that presetting is operating.

3. The television receiver according to claim 2, wherein said controlling means causes character information representing completion of presetting to be generated from said character generating means after the completion of presetting.

4. A television receiver comprising:

a tuner for receiving a television signal;

memory means in which tuning data is stored in advance
for each position;

an operating portion for a user to select a desired selected
channel;

controlling means for supplying tuning voltage to said
tuner on the basis of the tuning data stored at a position
in said memory means corresponding to the desired
channel when that position is selected by said operating
portion;

tuning-point detecting means for detecting a tuning point
on the basis of an output of said tuner;

display means for converting the output of said tuner to a
video signal and displaying the same;

and a power supply circuit for supplying electric power
from a commercial power source to various circuits;

wherein said controlling means detects whether or not the
tuning data is not stored in all the positions of said
memory means, and detects whether or not said operating means portion has been operated during a fixed
period after detection of the turning on of the power of
said power supply circuit, and if the operation of said
operating portion is not detected, said controlling
means causes presetting to be automatically effected for
each position of said memory on the basis of an output
of said tuning-point detecting means, whereas if the
operation of said operating portion is detected, said
controlling means causes a normal power-on operation
which does not accompany the presetting operation to
be effected.

5. A television receiver comprising:

a tuner for receiving a television signal;

memory means in which tuning data is stored in advance
for each position;

an operating portion for a user to select a desired selected
channel;

controlling means for supplying tuning voltage to said
tuner on the basis of the tuning data stored at a position
in said memory means corresponding to the desired
channel when that position is selected by said operating
portion;

tuning-point detecting means for detecting a tuning point
on the basis of an output of said tuner;

display means for converting the output of said tuner to a
video signal and displaying the same;

and a power supply circuit for supplying electric power
from a commercial power source to various circuits;

wherein said controlling means detects whether or not the
tuning data is not stored in all the positions of said
memory means, and detects whether or not said operating means portion has been operated during a fixed
period after detection of the tuning on of the power of
said power supply circuit, and if the operation of said
operating portion is not detected, said controlling
means causes presetting to be automatically effected for
each position of said memory on the basis of an output
of said tuning-point detecting means, whereas if the
operation of said operating portion is detected, said
controlling means causes a normal power-on operation
which does not accompany the presetting operation to
be effected wherein said memory is provided with a bit for discriminating whether said television receiver is in a factory
mode, and the operation proceeds to a normal power-on
state by discriminating the bit.

* * * * *